United States Patent
Liao

(10) Patent No.: US 6,646,203 B1
(45) Date of Patent: Nov. 11, 2003

(54) CABLE RACK

(76) Inventor: Jung Hung Liao, PO Box 82-144, Taipei (TW)

( * ) Notice: Subject to any disclaimer, the term of this patent is extended or adjusted under 35 U.S.C. 154(b) by 0 days.

(21) Appl. No.: 10/233,540

(22) Filed: Sep. 4, 2002

(51) Int. Cl.[7] .................................................. H02G 3/04
(52) U.S. Cl. .............................. 174/97; 174/48; 174/95
(58) Field of Search ........................ 174/48, 68.1, 68.3, 174/95, 96, 97, 98, 99 R, 101

(56) References Cited

U.S. PATENT DOCUMENTS

| | | | | |
|---|---|---|---|---|
| 406,818 A | * | 7/1889 | Cook | 174/95 |
| 4,907,767 A | * | 3/1990 | Corsi et al. | 174/97 |
| 5,089,667 A | * | 2/1992 | Goussin et al. | 174/101 |
| 5,274,194 A | * | 12/1993 | Belcher | 174/50 |
| 5,814,767 A | * | 9/1998 | Katz | 174/68.1 |
| 6,107,575 A | * | 8/2000 | Miranda | 174/101 |
| 6,384,336 B1 | * | 5/2002 | VanderVelde et al. | 174/95 |

FOREIGN PATENT DOCUMENTS

| | | | | |
|---|---|---|---|---|
| DE | 3335884 A1 | * | 4/1985 | H02G/3/04 |
| DE | 3426064 C1 | * | 1/1986 | H02G/3/04 |
| EP | 554702 A1 | * | 8/1993 | H02G/3/04 |
| GB | 2237938 A | * | 5/1991 | H02G/3/04 |
| GB | 2258092 A | * | 1/1993 | B65D/1/22 |

* cited by examiner

*Primary Examiner*—Dean A. Reichard
*Assistant Examiner*—Adolfo Nino
(74) *Attorney, Agent, or Firm*—Leong C. Lei

(57) ABSTRACT

An all-purpose, lower production cost cable rack structure comprised of a rack and an upper lid, containing multiple separators each having at its lower edge formed a press seat adhered to the bottom inside the rack, a latching track protruding from the top edge of the separator to forthwith lock up a ceiling panel with a C-shape latching member, number and spacing of separator inside the rack being adjustable to cope with various purposes, avoid accidental fall of the cable, permit easier maintenance and low production cost for upgrading agility and economic effects of the cable rack.

1 Claim, 5 Drawing Sheets

CABLE RACK

BACKGROUND OF THE INVENTION (a) Field of the Invention

The present invention is related to a cable rack, and more particularly, to one containing multiple separators that are adjustable by number and by spacing to offer wider coverage of application for general purpose, lower production cost, and easier maintenance.

(b) Description of the Prior Art:

Usually many cables of connection for various purposes are required to be installed in a building, e.g. electric cable, communication cable or network cable and these cables come in different specifications. To maintain nice and tidy interiors and to facilitate repair and maintenance works, generally all cables are put together in a cable rack. The cable rack of the prior art as illustrated in FIGS. 1 and 2 is comprised of a U-shape rack 10 and an upper lid 15. Wherein, a latching edge 11 is formed respectively on the top edge of both side penals of the rack 10, a hooking edge 16 corresponding to the latching edge 11, is each formed on both sides of the upper lid for the upper lid 15 to be directly fastened to the rack to define an accommodation room.

However, there is no separator provided in the accommodation room since all cables are just put together in the same rack resulting in that all cable are vulnerable to be interfered by the magnetic field created by each live cable. Furthermore, as the cable frame is usually fixed on the wall or at a higher place, cables could easily fall on the ground when the upper lid 15 is opened to make service job more difficult.

Later an improvement of a cable rack made by the trade teaches that, as illustrated in FIGS. 3 and 4, a latch 21 curved inwardly is each provided on both side penals of a rack 20 to lock up an upper lid 26. A lateral support fork 22 is each extending downward from said two latches 21, and multiple pairs of tracks 23 are formed on the bottom inside the rack 20 to retain an inverse Y-shape separator 24 provided with a locking tag 240 each on two branches of the reverse Y-shape separator 24. A covering plate 25 adapted with a limiting tag 250 is sandwiched by the support fork 22 while a unit of latching device comprised of a hook 27 and a press 28 corresponding to each other is each formed on both sides of the upper lid 26 for the upper lid 26 to be locked to the top edge of the rack 20.

However, defectives of being vulnerable to mutual interference and prevention of an easy service job as observed with the prior art though have been corrected by the improvement, the track 23 for being integrated with the rack 20 and the separator 24 being fixed in position accordingly prevent adjustment as required. Furthermore, as the covering plate 25 to prevent falling of the cable is inserted through the space available between the latch 21 and the support fork 22 of the rack, the access to the rack 20 has to be made only from thee free end of the rack making the assembly and service difficult. During the molding process of the rack 20, the latch 21, the support fork 22 and the track 23 must be molded at the same time, making more difficult for the design of molds and the production process, thus higher production cost. Finally, the range of application is also limited due to that the location of the separator 24 is fixed.

As described above, the prior art known for common defectives including mutual interference, dropping cable, difficult access for service, and high production cost that significantly affect its common usage and economic benefits requires further improvement.

SUMMARY OF THE INVENTION

The primary purpose of the present invention is to provide an all-purpose cable rack that offers adjustment as required and easy assembly and service.

Another purpose of the present invention is to provide an all-purpose cable rack that permits lower production cost with higher economic benefits.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
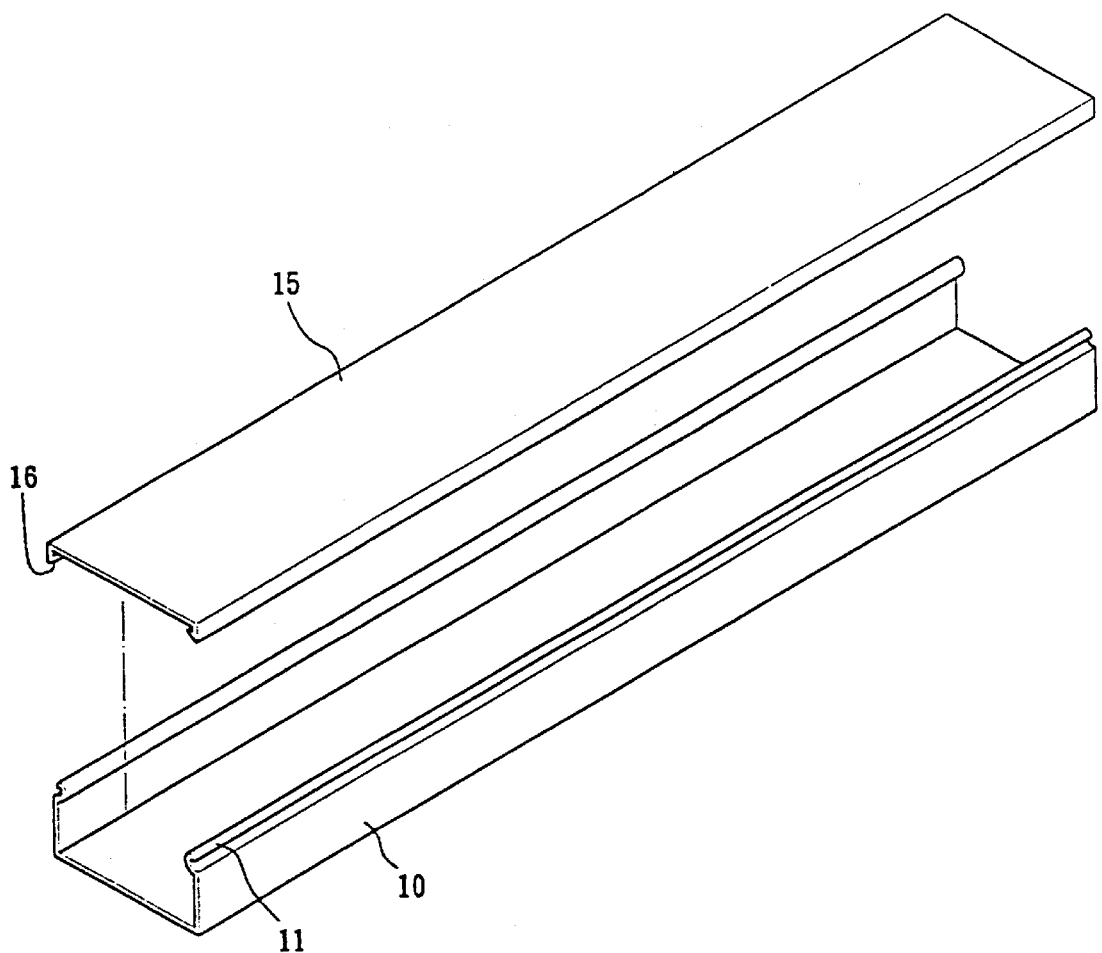
FIG. 1 is an exploded view of a cable rack of the prior art.
Figure 2:
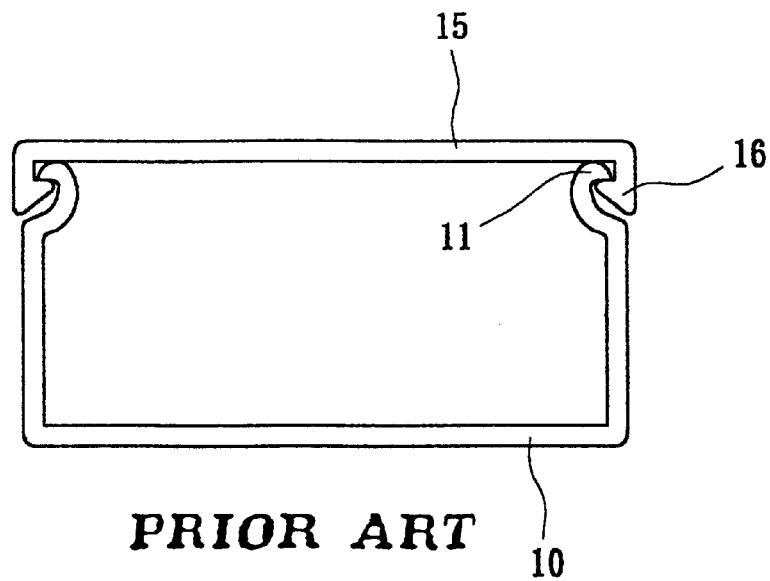
FIG. 2 is a sectional view of the cable rack of the prior art.
Figure 4:
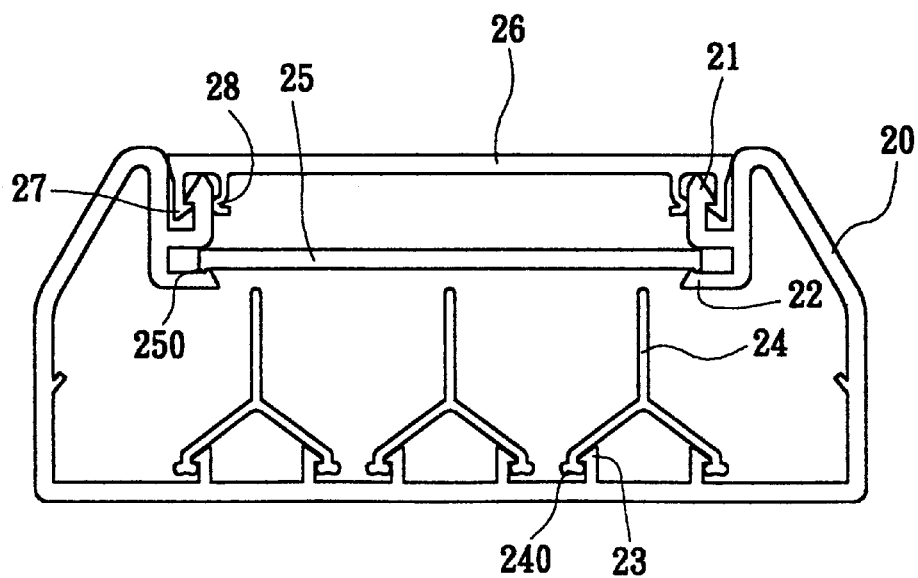
FIG. 4 is a sectional view of the cable rack of another prior art.
Figure 3:
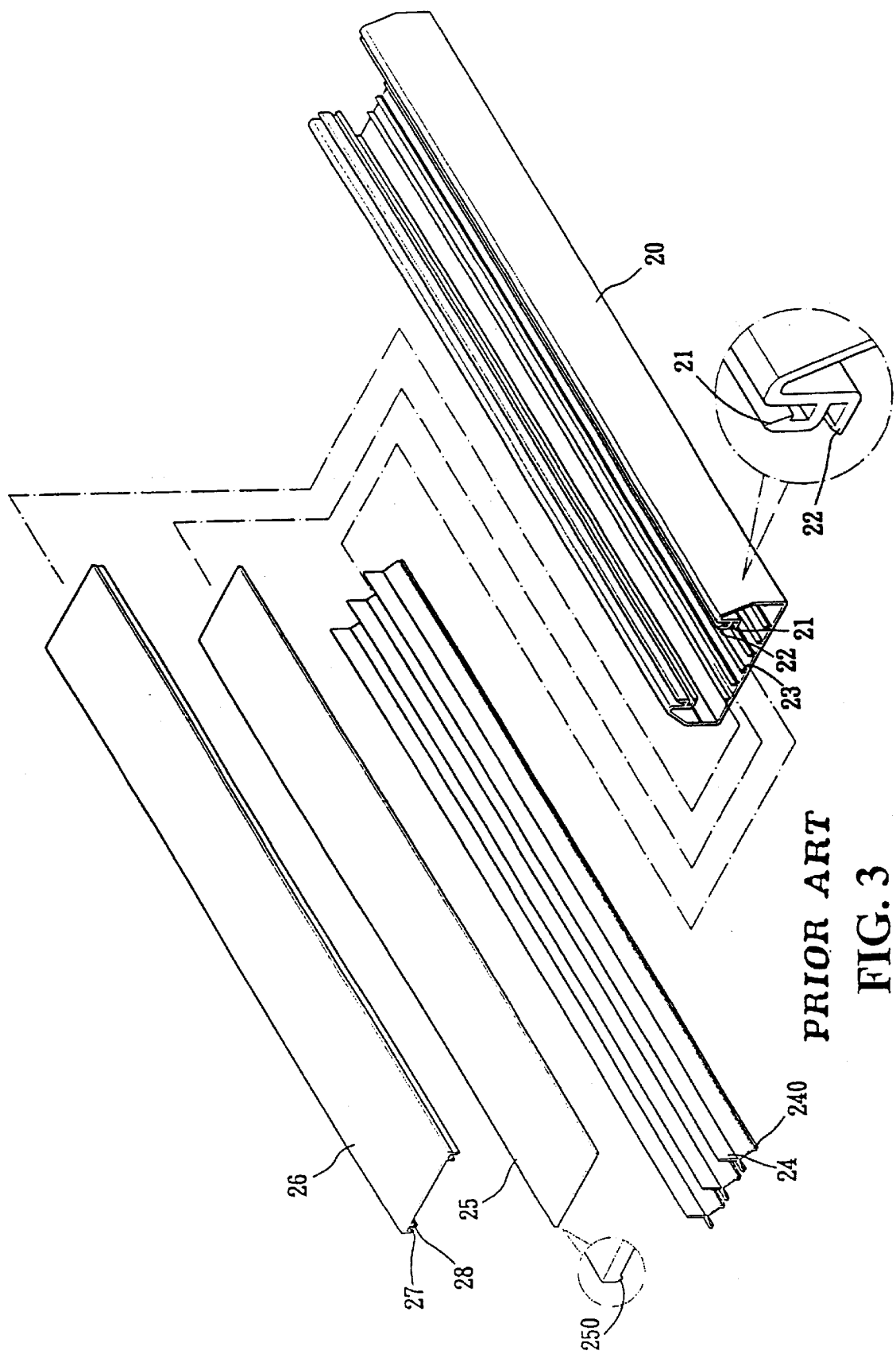
FIG. 3 is an exploded view of a cable rack of another prior art.
Figure 5:
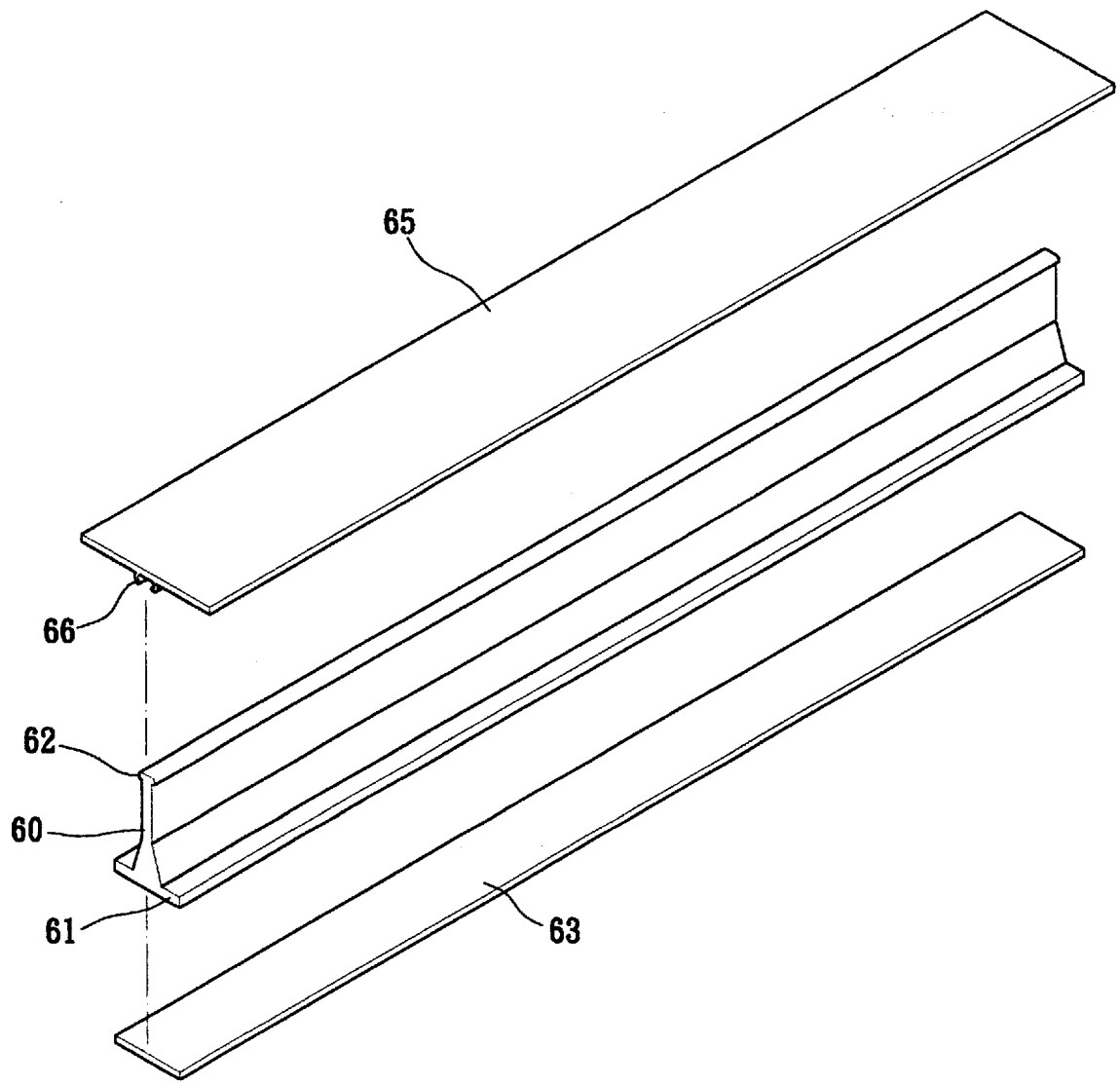
FIG. 5 is an exploded view of a cable rack of the present invention, showing profile of the separators and their relationship to one another.
Figure 6:
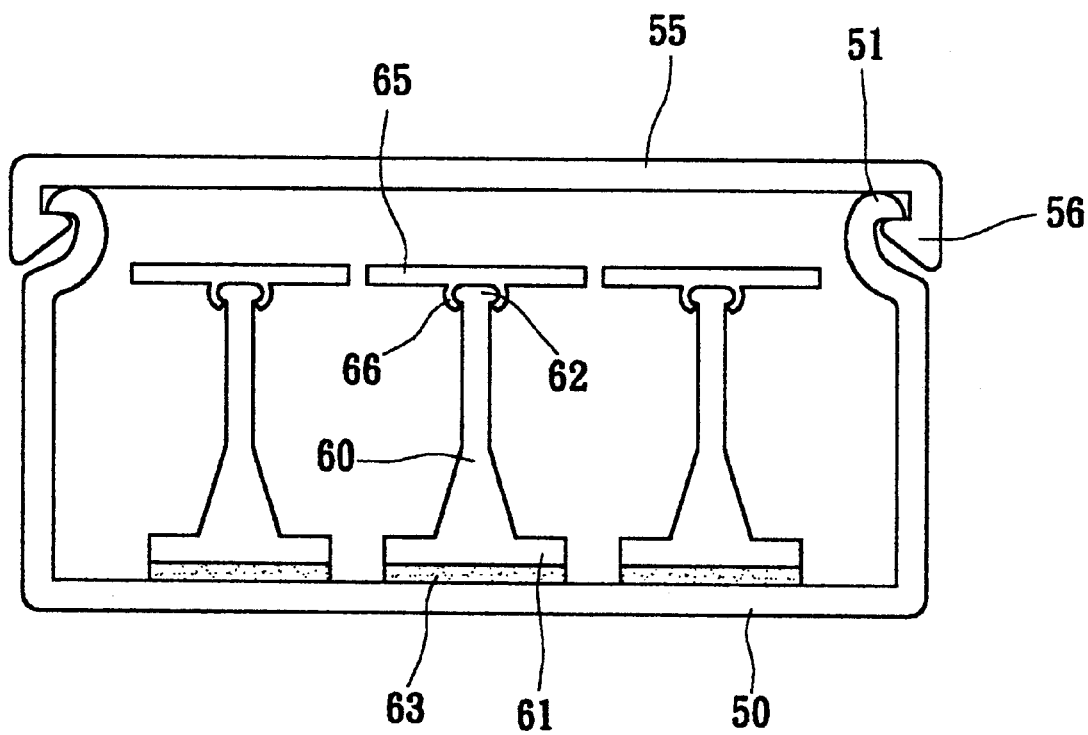
FIG. 6 is a schematic view showing the present invention in use.

As illustrated in FIGS. 5 and 6, a preferred embodiment of the present invention is comprised of a U-shape rack 50 and an upper lid 55. Wherein, a latching edge 51 and a corresponding hooking edge 56 is provided on both sides of the upper lid 55 for the upper lid to cover up the top of the rack 50 to define a space for accommodating cables. Both of the rack 50 and the upper lid 55 are identical to the prior art.

Also as illustrated in FIGS. 5 and 6, the preferred embodiment further includes multiple separators 60 with each having at its bottom formed a lateral press seat 61 attached to the bottom of the rack 50 with a magic tape 63. A latching track 62 is each protruding towards both sides from the top edge of the separation seat to be caulked by the ceiling panel 65, and a C-shape latching member 66 formed at the center beneath the ceiling panel 65 to forthwith catch the latching track 62 of the separator 60.

The separator 60 depending on its number and its spacing as required is adhered to the bottom inside the rack 50 to complete a structure of an all-purpose cable rack at low production cost.

In practice, if two types of cable are used, only one separator 60 is sufficient to divide the rack 50 into two compartments; or if three types of cable are used, two separators 60 are required. In the preferred embodiment of the present invention as illustrated in FIG. 6, four types of cable are used. Wherein, three separators 60 are provided to divide the rack 50 into four compartments for each to receive the running of each type of the cables to avoid mutual interference. Furthermore, since the separator 60 is not integrated with the rack 50, the location of the individual separator 60 can be determined depending on the size or quantity of the cable by changing the spacing between two separators 60 to cope with various requirements and adapt to those existing cable racks in different specification, thus to significantly increase the applicability for general purpose of the present invention.

Meanwhile, as the separator 60 is covered by a ceiling panel 65 to prevent dropping cable in the service work, the ceiling panel 65 forthwith covers up the separator 60 from its top, allowing easy assembly of the cable rack 50. Furthermore, the separator 60 of the present invention is also applicable to any conventional rack 50; therefore, it is not necessary to develop exclusive mold for the rack 50. The only production is required by the separator 60 resulting in significant reduction of production cost and upgraded economic benefits for the entire rack of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A cable rack comprising a rack and an upper lid to cover up the top of said rack, wherein a plurality of separators are provided in said rack, a horizontal press seat being formed on the bottom of each respective one of said separators to attach said separators to the inner bottom of said rack, a latching track formed on the top end of each of said separators and each protruding toward both sides to engage with a respective ceiling panel, a C-shape latching member being formed in the center beneath each of said ceiling panel, and each of said C-shape latching member being directly caulked into a respective one of said latching tracks, said separators being adhered to said inner bottom of said rack by said press seat being attached to said inner bottom of said rack with tape so that the number and location of said separators is adjustable, two latching edges being provided each on respective opposite sides of said rack side, and two hooking edges being provided each on respective opposite sides of said upper lid for engaging with said latching edges.

* * * * *